July 14, 1953   A. BULOVA   2,645,078
JEWEL BEARING AND METHOD OF MAKING SAME
Filed Aug. 22, 1949   2 Sheets-Sheet 1

INVENTOR
ARDÈ BULOVA.
BY
ATTORNEY

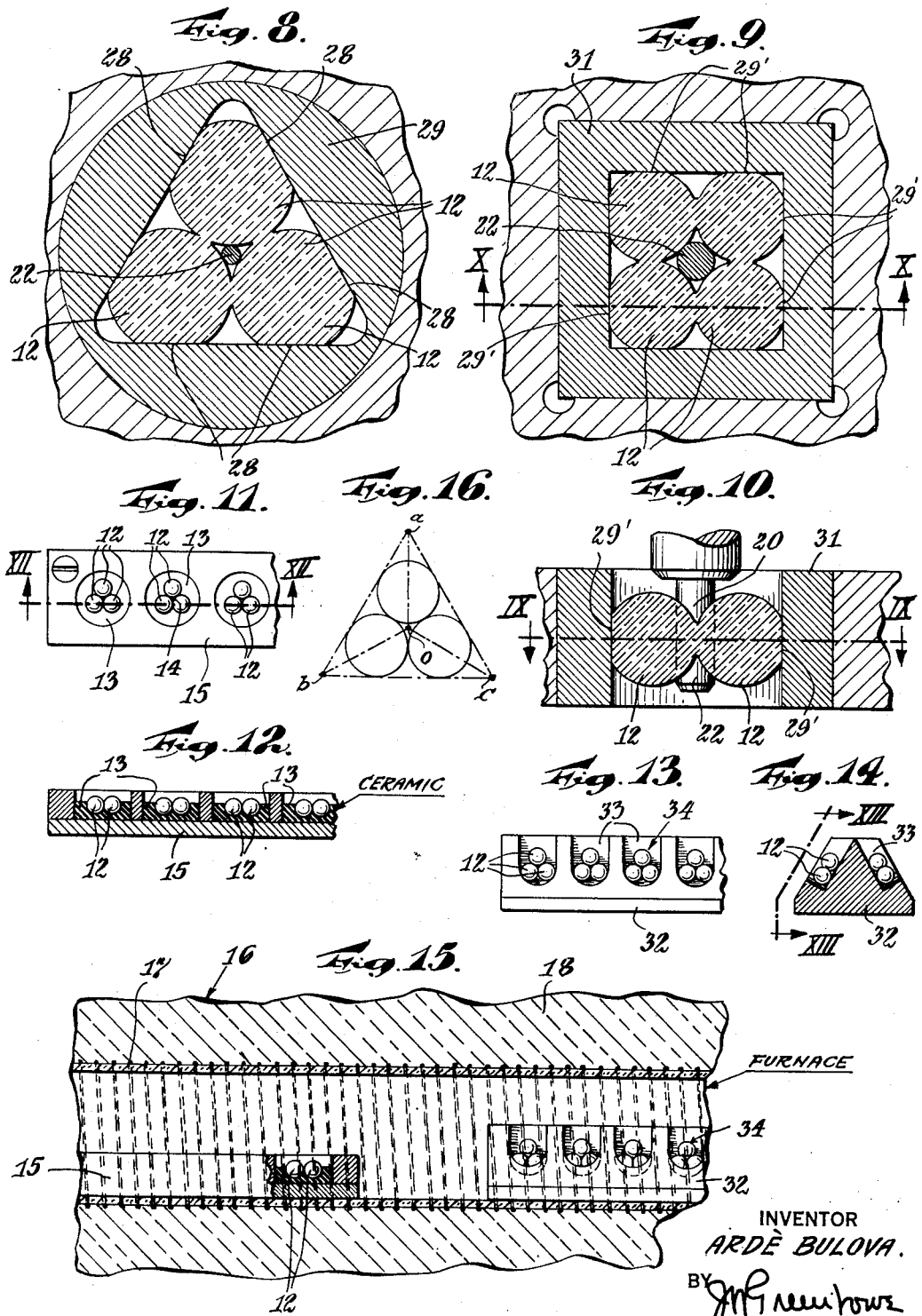

Patented July 14, 1953

2,645,078

UNITED STATES PATENT OFFICE 2,645,078

JEWEL BEARING AND METHOD OF MAKING SAME

Ardé Bulova, New York, N. Y.

Application August 22, 1949, Serial No. 111,669

6 Claims. (Cl. 58—140)

This invention relates to bearings for rotatable shafts or pivots and relates more particularly to the manufacture of bearing jewels for chronometers or precision instruments.

When producing a bearing as for example a bearing jewel for a watch movement, it is essential not only to provide a surface as free from friction as possible in which a rotating shaft or pivot is journaled, but to provide oil storage capacity. Although a problem is presented in meeting these requirements in the manufacture of relatively larger bearings the difficulty is multiplied when manufacturing extremely small size jewel bearings.

The manufacturing of these extremely small bearings imposes production difficulties, since the bearings must not only be made extremely accurate but must be produced at a high rate of speed to meet the demands established in the manufacture of watch and clock movements.

Bearings of this type generally consist of a precious or synthetic stone or other hard material. A body of such material must be cut to overall size and drilled to provide a bearing aperture which in turn must be highly polished to serve as the bearing surface. Certain jewels are drilled or otherwise formed to give what is termed a rounded or "olive hole" bearing in which a shaft or pivot is journaled. Others provide what is termed a "straight hole" bearing. The minute size of bearing jewels for this purpose makes the operation of accurate formation and inspection a difficult task since the dimensions and formation of the bearing must reach as near perfection as possible to eliminate friction between the journal of the rotating part and the bearing.

Another important function of this type of bearing is to provide ample surface area to retain a lubricant to increase the useful life of the moving parts. It can readily be understood, therefore, that the production of jewels of the present character is an important operation in the manufacture of horological instruments.

In accordance with the present invention a jewel bearing is produced by so assembling and uniting three or more bodies of wear resisting material as to provide a central aperture or passage having bearing surfaces adjacent storage areas or pockets for oil or other lubricant.

It is an object of the invention therefore to provide a method for expeditiously and effectively producing a jewel bearing having the bearing hole formed without the performance of a drilling operation.

Another object of the invention is to provide a bearing of several parts joined in accurate fixed relation to provide a multiple bearing surface having oil retaining pockets.

Another object of the invention is to provide accurately dimensioned spherical bodies and in uniting the bodies to provide an integral unit presenting surfaces in fixed relation to receive the journal of a rotating shaft or pivot.

Another object of the invention is to provide a bearing surface consisting of a plurality of spherical members united to form a bearing unit with a portion of each member forming a bearing surface and other portions serving as oil retaining areas.

Another object of the invention is to provide a watch jewel having a multiple point contact for a pivot.

Other objects and advantages of the invention will be more fully understood by reference to the following description together with the accompanying drawing, in which Fig. 1 shows a watch movement as an example of one use of the present invention;

Fig. 8 is a sectional view of a bearing showing spheres with flat sides to fit a setting;

Fig. 9 is a sectional view of a bearing showing an arrangement of four spherical bodies with flattened sides to fit a setting;

Fig. 10 is a view taken on line X—X in Fig. 9;

Fig. 11 shows a boat for holding clusters of spheres to be placed in a furnace for a fusing or sintering operation;

Fig. 12 is a view taken on line XII—XII in Fig. 11;

Fig. 13 shows another form of boat with inclined pockets to hold clusters of spheres viewed in the direction of arrows XIII—XIII in Fig. 14;

Fig. 14 is transverse sectional view of the boat shown in Fig. 13;

Fig. 15 is a diagrammatic view showing a furnace or oven for treating groups of spheres supported in boats or troughs and Fig. 16 is a diagrammatic view of the relation of three spherical members when positioned to be united to form a bearing.

As shown the present invention provides several spherical members such as precious or synthetic stones or other suitable material having the required hardness united to provide a jewel bearing.

In practicing the invention in the manufacture of a watch jewel for example, three spherical bodies of synthetic sapphire each of the same diameter and of accurate dimensions are disposed in contacting relation with centers coinciding with the intersecting boundary line of a triangle.

As shown in Fig. 16 three spherical bodies of equal diameters are disposed in a common plane. The arrangement is such that in a plane passing through the centers of the spheres, angles obc, cca and cab form congruent isosceles triangles. The central space between the spheres in the plane of the centers of the spheres, forms what may be termed an interior curved triangle. Thus the surfaces of this triangle serve as bearing surfaces and since these surfaces converge inwardly and are part of the spherical surfaces, they serve not only as three point bearing contacts but provide spaces at the intersections of the interior angle as storage areas or pockets to retain a lubricant.

The diameters of the spherical members may be preselected to give the size bearing aperture or bearing hole desired and provide a three-point bearing contact surface, as when three spherical bodies are united. When disposed in contacting relation the bodies are subjected to a temperature sufficient to fuse the contacting areas of the bodies to unite and hold them in the required fixed relation to serve as a bearing unit. In the case of extremely small spheres the joining by heat may be accomplished in much the same manner as metallic or other particles are joined by a sintering action.

Although the present bearing may be used in a variety of forms to meet the requirements of precision instruments, or the like, the present drawing illustrates a practical embodiment of the invention as applied to a watch movement.

Two types of jewel bearing holes are in general use. The straight hole type having a sharp edge at the top and bottom periphery of the hole usually used for train pivots and the olive type hole in which the edges at the top and bottom are ground off thus reducing the contact area in which the pivot is journaled and preferred for escape wheel, pallet and balance pivots.

As will be readily understood the drilling and grinding of a jewel made for example of synthetic ruby or sapphire is a difficult and painstaking procedure. It is of course necessary to preserve accuracy and jewels must be made in a variety of shapes and dimensions as well as diameters of hole sizes. Furthermore, it is important to provide a jewel of such configuration that sufficient surface is provided to retain the required lubricant.

In accordance with the present invention the manufacture of this type of jewel has been greatly simplified.

Figure 1:
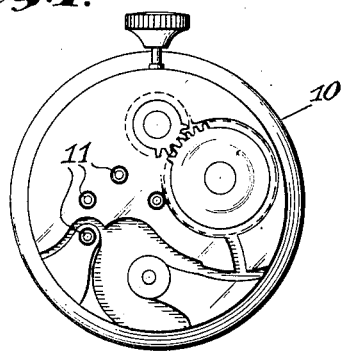

In Fig. 1 of the drawing a watch movement 10 having a train wheel bridge is shown with several jewel bearings 11. The present invention eliminates the necessity for performing a drilling operation to provide a bearing hole. Instead of drilling a shaped piece or blank the stock such as a synthetic sapphire or other suitably hard material is first given a spherical form.

The size of the sphere employed will depend on the size of the bearing hole or bearing surface required. Having determined the size of the bearing hole the bearing material is given a spherical shape of a selected diameter.

These spherical members may then be placed in a suitable support or holder as for example three spheres 12, as shown in Fig. 11, may be positioned in a support or holder 13 which latter may be of a ceramic or heat resisting material. If desirable the support may be of a material having a melting point at the temperature required to fuse and join the spheres so that the support will be destroyed leaving the joined spheres ready to be removed as a unit.

The spheres 12, if three are employed, may be arranged with their axial lines or centers equal distances apart since the spheres are of equal size. This arrangement results in a central passage or bearing hole 14 to receive a pivot or shaft as will be more fully explained.

Spheres supported in holders may be placed in a boat 15 and placed in an oven or furnace 16. This furnace may be of any suitable type capable of supplying heat sufficient to fuse or sinter the contacting surfaces of the spheres together. The electric furnace indicated may be of any well known type employing a resistance element 17 surrounding a heat resisting sleeve encased in a wall or housing 18.

The positioned spheres carried by the boat may be held in the furnace for just sufficient time and at a selected temperature, depending on the material of the spheres, to cause the spheres to be joined by fusion or coalesce making a single integral structure or bearing unit.

Figure 2:
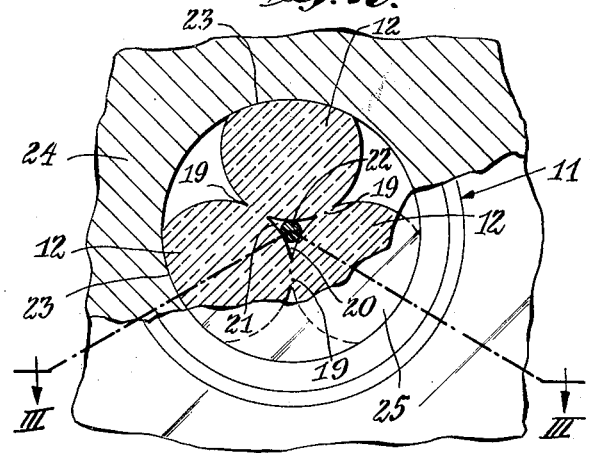
Fig. 2 is an enlarged view, partly in cross-section, of a bearing produced in accordance with the present invention.

As shown in Fig. 2 a bearing is provided consisting of three spherical members 12 joined at 19 and thus furnishing a bearing hole 21 to receive a shaft or pivot 22. The bearing hole 21 by reason of the surfaces of the spheres provides, in the case of a three sphere assembly, a three point contact with formed olive type surfaces.

As will be apparent, bearing hole 21 is bounded by surfaces of the spheres which, in a given plane, form a curved triangle and thereby spaces or pockets 20 are provided to receive and retain lubricant. The angular relation of the intersecting walls of the bearing hole brings the surfaces in close relation creating a condition whereby capillary attraction serves to hold the lubricating oil, giving it greater cohesion. This permits a relatively large quantity of oil to be stored and resist chemical change and evaporation.

Figure 3:
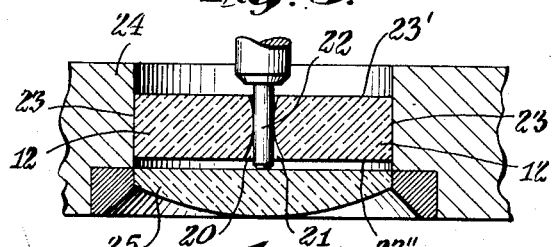
Fig. 3 is a view taken on line III—III in Fig. 2.
Figure 4:
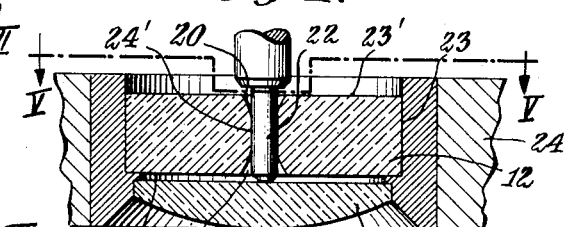
Fig. 4 is a cross-sectional view similar to Fig. 3 but showing a modified form of bearing hole.

When the spheres are joined together their outer surfaces 23, 23' and 23'' may be ground as in Fig. 2 to fit a setting 24 to support a pivot in conjunction with an end stone 25, as shown in Figs. 3 and 4.

Figure 5:
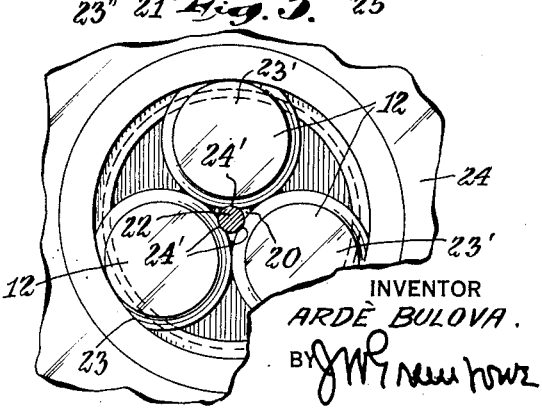
Fig. 5 is a view of Fig. 4 looking in the direction of arrows V—V.

As shown in Figs. 4 and 5 after the spheres 13 have been joined to form a bearing unit the surfaces of the bearing hole 21 may be lapped or ground to provide straight bearing surfaces 24 instead of curved or "olive" type surfaces, while still retaining the oil storage pockets 20.

Figure 6:
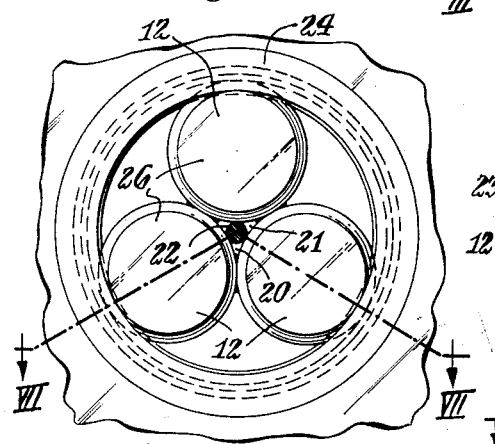
Fig. 6 is a view taken on line VI—VI in Fig. 7.
Figure 7:
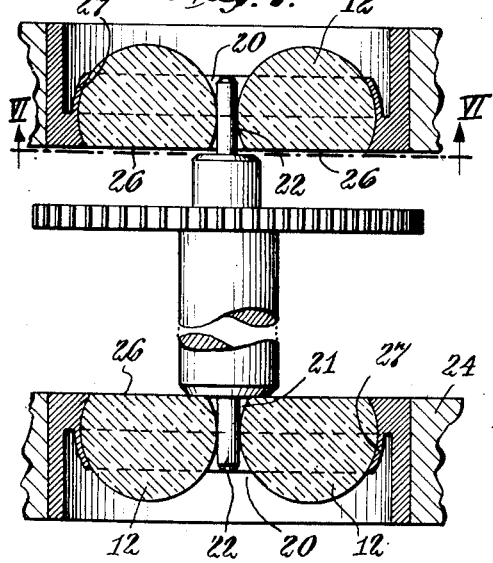
Fig. 7 is a view taken on line VII—VII in Fig. 6 and showing bearings in the plate and bridge of a watch movement.

Figs. 6 and 7 show a bearing in which the spheres are flattened or faced at 26 only and having a modified form of setting to accommodate the lateral curved surfaces 27 of the bearing. Fig. 8 shows a cluster of spherical bodies 12 joined to form a bearing unit and having the sides 28 flattened to triangular formation and held in a block or setting 29. As shown in Figs. 9 and 10 a cluster of four spheres 12 are joined to provide a bearing and having sides 29' faced to be received and held in setting 31.

As above pointed out the bearing material may be initially formed to provide spherical bodies of a predetermined size and a group of three or more supported in proper relation and then subjected to heat for joining by fusion or what may be termed sintering.

As shown, for example, in Figs. 11 and 12 the spheres are positioned in supports or holders 15 preparatory to introduction into the furnace for a fusing or sintering operation. If desirable a separator may be positioned in the central aperture 14 between the spheres. This separator in cooperation with the walls or wall of the support will serve to maintain the selected spaced relation of the sphere surfaces. The separator may be cylindrical or triangular in transverse cross-section as in the case of three spheres, and of a higher melting point than the spherical bodies to be fused.

In Figs. 13 and 14 a novel form of support is provided for holding the spheres during the fusing operation. As shown a support 32 of any heat resisting material such as a ceramic may be provided with inclined slots 33 of a width equal to twice the diameter of a sphere. The sphere cluster 34 may as shown be conveniently arranged and the support may constitute a boat which may be in the furnace. By having the support 32 formed with a plurality of slots a number of sphere clusters may be quickly arranged since the walls of the slots aid in arranging the positions of the spheres.

Although it is practical and convenient to form a bearing unit of spheres of equal diameters to provide a selected size bearing passage it will be evident that spheres of different diameters may be employed. For example, two spheres may be positioned in tangent relation to form two legs of the curved triangle (as when three spheres are used) of the bearing hole and a third sphere of a selected size may be positioned tangent to the positioned spheres to form the third leg of the triangle and complete the bearing hole.

It will be evident from the foregoing that the present invention simplifies the manufacture of jewel bearings. By the use of a plurality of joined bodies of wear resisting material it is possible to provide a bearing hole of a selected bearing surface in the absence of a drilling operation and with a minimum amount of burnishing or lapping as may be required. When employing joined spherical bodies a multiple contact giving a relatively small contact area is formed, thereby reducing friction. At the same time the storage capacity for lubricant is increased giving long life and free movement of the rotating elements.

It is to be understood that instead of being spherical the respective joined bodies may be of any suitable shape so that when joined in a group the initial bearing hole is formed to give a desired form of bearing surface.

Although a preferred embodiment of the invention is shown and described herein, it is to be understood that modifications and variations of form may be made therein without departing from the scope and spirit of the invention as set forth in the appended claims.

I claim:

1. A jewel bearing comprising three members of a wear-resisting material, each of said members having a portion of its surface of spheroidal form, the axes of said spheroidal surfaces being disposed in a common plane and with said surfaces in contact and joined by fusion to provide a single unit having a bearing hole between the spheroidal portions of said members.

2. The method of making a jewel bearing which comprises providing spherical bodies of fusible wear-resisting material, positioning a plurality of said bodies in a common plane and with their walls in contact so as to form a space bounded by portions of the surfaces of said bodies and in subjecting the positioned bodies to a heat treatment to unite the bodies by fusing at the points of contact to provide a bearing unit.

3. The method of making a jewel bearing which comprises providing spherical bodies of fusible wear-resisting material, positioning a plurality of said bodies in a common plane and with their walls in contact so as to form a space bounded by portions of the surfaces of said bodies and in subjecting the positioned bodies to a heat treatment to unite the bodies by fusing at the points of contact to provide a bearing unit and in deforming the outer surfaces of said unit.

4. The method of making a jewel bearing which comprises providing spherical bodies of fusible wear-resisting material, positioning a plurality of said bodies in a common plane and with their walls in contact so as to form a space bounded by portions of the surfaces of said bodies and in subjecting the positioned bodies to a heat treatment to unite the bodies by fusing at the points of contact to provide a bearing unit and in deforming the outer surfaces of said unit and in reshaping said surface portions.

5. A jewel bearing for a precision instrument comprising a plurality of spherical bodies positioned to form a passage therebetween and having contacting surfaces joined by fusion to provide a single multi-point bearing surface in said passage.

6. A jewel bearing for a precision instrument comprising three spherical bodies having opposed spherical surfaces held in fixed relation by fused contacting portions to form a single bearing unit with a central passage defined by said spherical surfaces.

ARDÉ BULOVA.

References Cited in the file of this patent

UNITED STATES PATENTS

| Number | Name | Date |
|---|---|---|
| 1,907,792 | Greenleaf | May 9, 1933 |
| 1,950,867 | Straumann | Mar. 13, 1934 |
| 2,478,865 | Fiechter | Aug. 7, 1949 |